MARY H. RAMSAUR, OF LINCOLNTON, NORTH CAROLINA.

Letters Patent No. 92,209, dated July 6, 1869.

IMPROVED MEDICAL COMPOUND.

The Schedule referred to in these Letters Patent and making part of the same.

Be it known that I, MARY H. RAMSAUR, of Lincolnton, in the county of Lincoln, and State of North Carolina, have invented a new and improved Medicine, called "Docenella," for curing rheumatism, neuralgia, headache, toothache, sores of long standing, chills and fevers, consumption, &c., and which also acts upon the liver; removes blotches and pimples and eruptions of all kinds; beautifies the complexion by purifying the blood; imparts brilliancy to the eyes, and a bright, rosy tint to the cheeks; renews prostrated energies in the old, and makes them feel young again; acts upon the kidneys, and is a powerful tonic; is also good for sore throat, soreness arising from colds, paralysis, and pains of any kind, such as cholic, &c. It regulates the bowels, and gives tone and strength to the stomach, and removes stiffness from the limbs.

This medicine is prepared as follows:

To one pint of whiskey add one ounce of wild ratsbane, (wild arsenic, pipsissewa,) ten grains cloves, one teaspoonful of ginger, one teaspoonful of corn-meal.

Mix all together, and let stand for three days.

Take a wine-glass full three times a day, and rub the parts affected with a flannel, saturated with the liquid, until the pain or disease is removed.

What I claim as my invention, and desire to secure by Letters Patent, is—

The above-described compound, prepared substantially as and for the purpose set forth.

MARY H. RAMSAUR.

Witnesses:
JOSEPH McLAUGHLIN,
O. E. MAROON.